Figure 2:
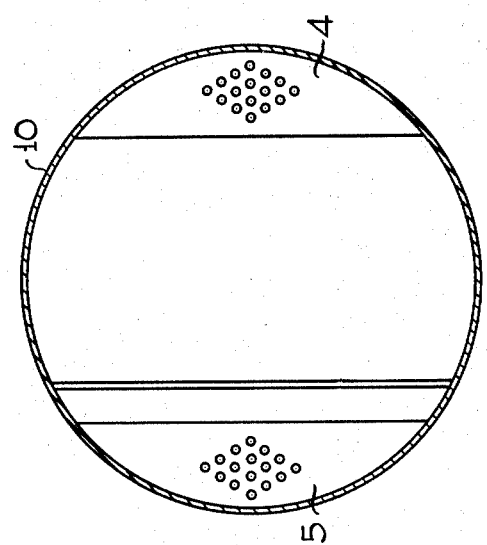

Feb. 16, 1954     C. O. RHYS, JR., ET AL     2,669,505
CONTACTING PLATE FOR LIQUID-LIQUID EXTRACTION TOWER
Filed Dec. 18, 1948     2 Sheets-Sheet 1

Cyril O. Rhys, Jr.
William E. Stanton   Inventors

By W.O.T Heilman Attorney

Feb. 16, 1954 C. O. RHYS, JR., ET AL 2,669,505
CONTACTING PLATE FOR LIQUID-LIQUID EXTRACTION TOWER
Filed Dec. 18, 1948 2 Sheets-Sheet 2
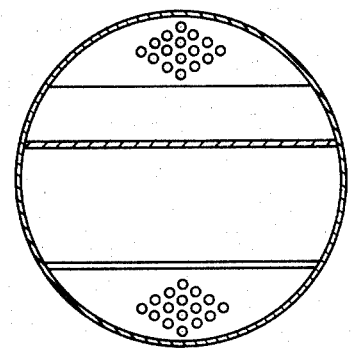
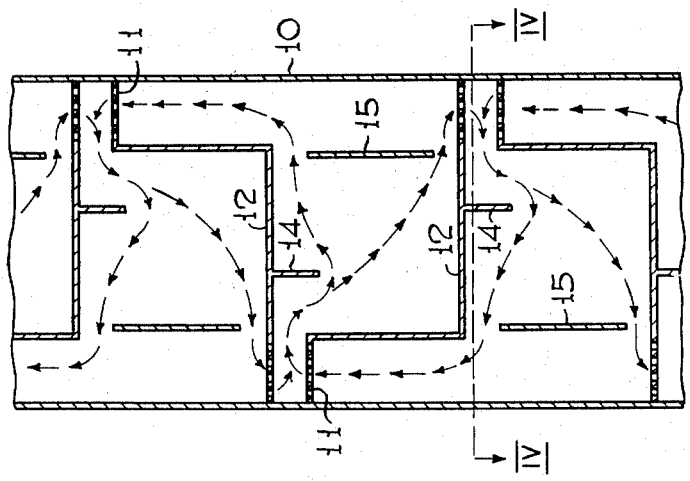
Cyril O. Rhys, Jr.
William E. Stanton   Inventors
By W.O.J Heilman  Attorney Patented Feb. 16, 1954

2,669,505

UNITED STATES PATENT OFFICE 2,669,505

CONTACTING PLATE FOR LIQUID-LIQUID EXTRACTION TOWER

Cyril O. Rhys, Jr., Westfield, and William E. Stanton, Elizabeth, N. J., assignors to Standard Oil Development Company, a corporation of Delaware Application December 18, 1948, Serial No. 66,106

1 Claim. (Cl. 23—270.5)

The present invention relates to an improved process and apparatus for the contacting of two normally immiscible, or partly miscible liquids. The invention is adapted for the contacting of liquids in any liquid-liquid system. In accordance with the present invention a novel perforated plate construction is employed in a vertical tower characterized by providing countercurrent mixing and concurrent settling of the liquids being contacted in each pair of plates throughout the tower.

The invention is directed broadly to processes in which liquids are fractionated by selective solvent action. At the present time there are a great many chemical processes in which a selective solvent is used to treat a particular liquid in order to secure a partial segregation, or fractionation of chemical constituents of the liquid. For example, petroleum oils are conventionally treated with solvents such as liquid sulfur dioxide, phenol, creosole, nitrobenzene, furfural, aniline, ether and other solvents or mixture of such solvents. Use of these solvents with petroleum oils is particularly employed to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired. For example, auxiliary solvents, or modifying agents, may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications, which may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types, some employing various types of packing materials, others employing bubble cap plates, and others employing a wide variety of internal baffles. However, of the various types of fluid contacting towers developed those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50% and in some liquid-liquid systems, as low as about 10%. By plate efficiency as that term is used, it is meant that each plate is effective in accomplishing a particular percentage of the efficiency contact which can be achieved in a single stage, equilibrium, batch mixer and settler. Thus one theoretical stage is established by contacting two liquids intimately in a batch mixer followed by a thorough settling in a batch settler. As stated, therefore, conventional pierced plate liquid contacting towers, due to their plate efficiency of about 50% substantially required a number of plates greater than twice the number of theoretical stages of contacting required. It is clearly of the greatest importance to improve the plate efficiency of the types of pierced plates used in such towers in order to decrease the expense of the contacting and to decrease the size of the towers necessary. It is, therefore, the principal object of this invention to provide an improved type of pierced plate extraction tower in which the plate efficiencies are substantially above 50%.

In analyzing the necessary mechanism required in liquid-liquid contacting it is apparent that two basic effects are required. These are efficient mixing of the liquids followed by efficient separation of the mixed liquids. Thus in extraction towers having a given number of plates, for best over-all results it is necessary that each set of plates, provide good mixing and provide good settling. Only by achieving both of these desiderata in such a tower is it possible to secure treating effects equivalent to a large number of theoretical stages. Conversely considering any one pair of extraction plates, high plate efficiencies can only be obtained if the plates are capable of both thoroughly mixing and thoroughly separating the mixed liquids. It is therefore, a further and more particular object of this invention to provide a type of pierced plate which will most effectively be capable of thoroughly mixing and thoroughly settling liquid phases passing through each pair of plates.

In developing a particular pierced plate design for contacting a given liquid-liquid system, it is necessary to secure certain basic data as to the mixing and settling characteristics of the liquids concerned. For example, certain liquids may be very readily mixed, but when mixed are difficult to separate. Alternatively, other types of liquids are difficult to mix but may be readily separated. As a result of this factor extraction towers known to the prior art have been of different types depending upon the particular liquid-liquid system to be contacted. One of the objects of this invention is to provide an extraction tower which may be readily designed for any liquid-liquid system to provide the necessary mixing and settling capacities to meet the particular characteristics of the liquids to be treated. Thus the extraction tower of the present invention is adapted to the contacting of two liquids which are easy to mix but hard to separate, such as phenol and oil, or to the contacting of two liquids which are difficult to mix but easy to separate such as caustic solutions and oil.

A particular characteristic of extraction towers employing pierced plates of the general character indicated, is the possibility of remixing or entraining the two fluids after they have been separated. It is therefore, a further object of this invention to provide a novel plate design which will minimize the possibility for the remixing of the fluids after they have been separated on the plate.

In accordance with these objectives of the present invention, a novel perforated plate design is provided which accomplishes intimate countercurrent mixing of the liquids to be contacted in a confined portion of adjacent plates. A second zone consisting of an enlarged section of the adjacent plates is provided through which the mixed liquids may concurrently flow at relatively low velocities in order to attain efficient separation of the mixed liquids. And finally a third zone is provided between adjacent plates, to permit accumulation of the separated liquids so as to develop sufficient liquid heads to drive the liquids to successive mixing zones. The nature of this invention will become clear from a consideration of the following description which makes reference to the accompanying drawings. In these drawings Figure 1 constitutes an elevational view of a portion of an extraction tower embodying the extraction plates of this invention and Figure 2 comprises a sectional view through line II—II of Figure 1 showing a top view of one plate section of the tower of Figure 1.

Figures 3 and 4 respectively show an elevational and cross-sectional view of a somewhat different embodiment of the extraction plate of this invention wherein Figure 4 is a sectional view through the line IV—IV of Figure 3.

Figure 1:
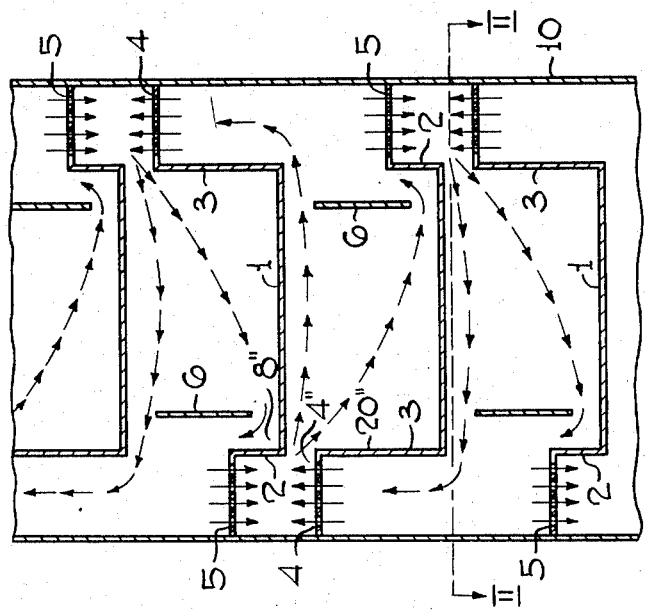

Referring now to Figures 1 and 2, an embodiment of the extraction plates of this invention is illustrated which is particularly suitable for the contacting of two liquids of low differential gravity. The plates of these figures are well adapted to the contacting of phenol and oil, for example. Referring to the figures, it will be noted that each plate in the tower 10 comprises three steps. In other words, each plate consists of three different portions arranged at three different levels. Thus a particular plate consists of an uppermost step indicated by the numeral 4, a lowermost step indicated by the numeral 1, and an intermediate height step indicated by the numeral 5. The two higher steps of this plate arrangement, steps 4 and 5, are perforated by a multitude of holes or slots, or by any type of perforations, as particularly shown by reference to Figure 2. The lowermost step of the arrangement and all other portions of the apparatus illustrated are not perforated, but are solid metallic members impervious to liquids. It will be noted that each successive plate in the tower is placed in reversed relationship. Thus, the uppermost step 4 of one plate is positioned directly below the lower step 5 of the plate immediately above it. As a consequence of this arrangement, a relatively confined zone is provided between the perforated steps 4 and 5 of adjacent plates. As will be seen, this confined zone between the lower perforated step of one plate and the uppermost perforated step of the next lower plate provides a mixing zone for the countercurrent mixing of liquids being contacted. Similarly, the zone provided between the lowermost steps of adjacent plates, that is, between the steps 1 and 1 of adjacent plates, provides a relatively enlarged settling zone for the separation of liquids which have been mixed in the mixing zone referred to. The settling zone is enlarged by virtue of the fact that the zone is positioned in the central part of the tower and by virtue of the fact that the lowermost steps of adjacent plates are spaced relatively far apart as compared to the spacing of steps 4 and 5 providing the mixing zone. A still larger vertical separation of steps is maintained between the uppermost step 4 and the lower step 5 of the plate directly below so as to provide sufficient vertical height or head for the liquids to accumulate to build up sufficient pressure for jetting through the perforations of the plates, into the mixing zones.

Having now briefly described the general arrangement of the plate elements in the tower illustrated, the operation of this tower in liquid-liquid contacting may be understood. For the purposes of illustration, it may be assumed that the liquid-liquid system involved is a phenol-oil system. In this case, the phenol being heavier than the oil, the phenol will be introduced at the top of the contacting tower, while the oil will be introduced in the lower portion of the tower. The phenol will then flow downwardly through the tower, while the oil will flow upwardly through the tower. As will be seen, on each plate, a layer of phenol will accumulate which will extend above the perforated step 5 to provide a head of phenol, and similarly, an oil layer will build up below each plate extending below the perforations of step 4 to provide an oil head below these perforations. By this means, the differential head of phenol and oil acts to drive the phenol downwardly through perforations 5 and oil upwardly through perforations 4. As a result, the phenol and oil will countercurrently flow into the mixing zone provided between perforations 4 and 5 with the result that the phenol and oil will be thoroughly and intimately mixed in this zone. For the purposes of clarity, arrows have been placed on the drawing indicating the countercurrent flow of the two liquids in the mixing zone. The mixed liquids in the form of an unstable emulsion will then flow from the mixing zone into the enlarged settling zone provided in the central part of the tower. Here the unstable emulsion will tend to separate as it flows towards the opposite side of the tower. Thus oil will tend to separate from the emulsion to form the layer referred to on the under side of the step 1, while phenol will tend to separate to form a phenol layer on the upper side of step 1. This separation will be facilitated by the comparatively slow fluid flow through the settling portion of the plate arrangement and by virtue of the fact that the partially separated phenol and oil will flow concurrently in the settling portion. It will be noted that vertical baffles 6 are positioned adjacent to the step 5. These baffles serve the function of providing weirs so that unseparated oil and phenol cannot go beyond the separation zone. The layers of oil above these baffles and the layers of phenol below these baffles are such that the phenol and oil must flow under and over the edges of the baffles in order to leave the settling zone.

Referring now to Figures 3 and 4, as stated, a somewhat different embodiment of the preforated plates of this invention are illustrated. The arrangement of perforated plates shown in these figures is particularly adapted for the contacting of liquid systems having a relatively great differential density. Thus the embodiments of Figures 3 and 4 are particularly adapted for the treatment of liquids such as, oil and aqueous caustic solution which are relatively difficult to mix but easy to separate. The plates illustrated in Figure 3 may be considered to be derived from the plates of Figure 1 by dropping the step 5 of the plates shown in Figure 1 to the level of step 1 of these plates. As a result, the plates of Figure 3 comprises two step plates rather than three step plates. The uppermost step of this plate arrangement is indicated by the numeral 11 and as shown in Figure 4 comprises a perforated horizontal segment of the circular cross-section of the tower. The lower step of this plate, identified by the numeral 12, comprises a solid metallic member unperforated except for the portion of the step directly above the perforated step 11 of the next lower plate. By this arrangement, the perforated portion of the lowermost step 12 of each plate is positioned directly above the perforated step 11 of the next lower plate. The zone between the perforations of step 12 and step 11 thus corresponds to the mixing zone described in connection with Figure 1. Similarly, the enlarged portion of the tower provided between the unperforated portions of adjacent steps 12 provide a settling zone for the mixed liquids. The remaining zone of the tower provided between the under side of step 11 and the perforations of step 12 provides space for the accumulation of sufficient head of liquids to drive the liquids through the perforations indicated. The flow of liquids through the embodiment of Figure 3 is essentially that as formerly described in connection with Figure 1.

If it be assumed that a light oil and an aqueous caustic solution are to be contacted in the tower of Figure 3, the oil will be introduced at the bottom of the tower to flow upwardly through the tower while the aqueous caustic solution will be introduced at the top of the tower to flow downwardly through the tower. The oil and caustic solution will be respectively jetted through the perforations of the step 11 and the perforations of the step 12 for intimate countercurrent mixing in the mixing zone provided. The mixed liquids will then flow into the settling portion of the tower wherein a phase separation will occur, the oil tending to separate to form a layer on the underside of the unperforated portion of step 12 and the undermost portion of step 11. Similarly, the caustic solution will tend to separate to form a caustic solution layer on the uppermost side of the step 12. The baffles 14 and 15 illustrated may be used if desired to reduce the possibility for recycling or entraining the indicated fluid streams. Baffle 14 serves to bring the mixed oil and caustic to the center of the tray in a downward direction to begin the settling operation. Without this baffle the mixture could jet across the settling portion of the trays and the desired settling would not be accomplished. The vertical baffle 15 serves to limit the location of the emulsion in the settling zone so that unseparated oil and caustic cannot flow beyond this baffle. It is to be understood, however, that operation of the embodiment of Figures 3 and 4 does not depend solely upon the baffles 14 and 15, but that their use is optional.

As indicated, the embodiments of Figures 1 and 3 are particularly suitable to the liquid contacting of liquid systems of different characteristics. The embodiment of Figure 1 is particularly adapted for the contacting of two liquids which are relatively easy to mix, but difficult to separate, while the embodiment of Figure 3 is particularly adapted for the treatment of two liquids which are difficult to mix, but easy to separate. While it is to be understood that the application of this invention to particular liquid-liquid systems is well within the scope of any skilled engineer, suitable dimensions for the embodiments illustrated will be given for the purpose of illustrations. Referring to Figure 1, the diameter of the tower may be about 12 feet horizontally. The horizontal distance of steps 4, 1, and 5 are respectively about 18 inches, 9 feet—0 inches, and 18 inches. Step 4 is about 20 inches above step 1 and step 5 is about 8 inches above step 1. The perforated areas provided by steps 4 and 5 comprise about 10% of the total plate area. Suitable perforations may be obtained by drilling a multitude of ¼ inch to ½ inch diameter holes in the steps 4 and 5. Suitable perforations may be obtained by drilling about 3350 $\frac{5}{16}$ inch holes in step 4, and about 2420 ⅜ inch holes in step 5. The distance between successive steps 1 of adjacent plates is about 24 inches.

A suitable embodiment of the tower illustrated in Figure 3 has a total diameter of about 6 feet 6 inches. Steps 12 of adjacent plates are about 24 inches apart. Step 11 is about 20 inches above step 12 of each plate. Step 11 and the perforated portion of step 12 may be perforated by ¼ inch to ½ inch diameter holes and may comprise about 350 ⅜ inch holes in step 11 and about 160 ¼ inch holes in step 12. The vertical baffle 14 may extend for about 6 inches downwardly from step 1 and may be positioned about 7 inches from the vertical riser 26 between step 12 and step 11. The vertical baffle 15 may extend vertically about 18 inches and may be positioned about 7 inches from the tower wall with clearances of 1 inch below and 5 inches above.

What is claimed is:

An improved apparatus for the countercurrent contacting of liquids comprising a plurality of contacting zones disposed one above another within an upright shell, each of said zones limited by a pair of vertically displaced contacting plates extending across the entire cross section of the shell, each of said plates being characterized by two horizontal plane elements arranged at different levels and connected by a vertical imperforate plane element, each plate being perforated in its extreme portions next to the shell wall at points oppositely removed from said vertical plane element and at least one of the said horizontal plane elements of each plate having an imperforate portion intermediate the perforated portions of the plate, each of said plates being in reverse relationship with the next higher plate, whereby the perforated portion of the upper plane element of one plate is aligned below the perforated portion of the lower plane element of the next higher plate, said apparatus being further characterized by a vertical imperforate baffle element spaced from and positioned between each of the plates in substantial vertical alignment with said vertical imperforate plane element, said apparatus being further characterized by a second imperforate vertical plane element fixed to the lower side of each plate between the lowest perforated portion and the intermediate imperforate portion of said plate.

CYRIL O. RHYS, Jr.
WILLIAM E. STANTON.

References Cited in the file of this patent

UNITED STATES PATENTS

| Number | Name | Date |
| --- | --- | --- |
| 1,868,618 | Wagner | July 26, 1932 |
| 1,943,822 | Harrington | Jan. 16, 1934 |
| 1,951,787 | Child et al. | Mar. 20, 1934 |
| 2,009,347 | Sheldon | July 23, 1935 |
| 2,011,186 | Van Dijck | Aug. 13, 1935 |
| 2,271,462 | Pfennig | Jan. 27, 1942 |
| 2,274,030 | Atkins | Feb. 24, 1942 |
| 2,400,378 | Stines | May 14, 1946 |
| 2,400,962 | Thompson | May 28, 1946 |
| 2,460,019 | Long et al. | Jan. 25, 1949 |
| 2,609,276 | Casler et al. | Sept. 2, 1952 |
| 2,615,792 | Bacsik | Oct. 28, 1952 |